United States Patent
Clutterbuck

(10) Patent No.: US 6,444,145 B1
(45) Date of Patent: Sep. 3, 2002

(54) MOLDS FOR USE IN CONTACT LENS PRODUCTION

(75) Inventor: Timothy A. Clutterbuck, Jacksonville, FL (US)

(73) Assignee: Johnson & Johnson Vision Products, Inc., Jacksonville, FL (US)

( * ) Notice: Subject to any disclaimer, the term of this patent is extended or adjusted under 35 U.S.C. 154(b) by 0 days.

(21) Appl. No.: 09/389,795

(22) Filed: Sep. 3, 1999

(51) Int. Cl.7 ............................................... B29D 11/00
(52) U.S. Cl. ...................... 264/1.1; 249/117; 264/1.38; 264/2.5; 425/808
(58) Field of Search .................. 249/117, 160; 425/808; 264/1.36, 1.38, 1.1, 2.5

(56) References Cited

U.S. PATENT DOCUMENTS

| | | |
|---|---|---|
| 4,121,896 A | 10/1978 | Shepherd |
| 4,197,266 A | 4/1980 | Clark et al. |
| 4,208,364 A | 6/1980 | Shepherd |
| 4,209,289 A | 6/1980 | Newcomb et al. |
| 4,284,399 A | 8/1981 | Newcomb et al. |
| 4,565,348 A | 1/1986 | Larsen |
| 4,640,489 A | 2/1987 | Larsen |
| 4,865,779 A * | 9/1989 | Ihn et al. ..................... 425/808 |
| 4,955,580 A | 9/1990 | Seden et al. |
| 5,271,875 A | 12/1993 | Appleton et al. |
| 5,326,505 A * | 7/1994 | Adams et al. ............. 264/1.36 |
| 5,466,147 A | 11/1995 | Appleton et al. |
| 5,540,410 A | 7/1996 | Lust et al. |
| 5,975,875 A * | 11/1999 | Crowe, Jr. et al. .......... 249/117 |

* cited by examiner

Primary Examiner—Mathieu D. Vargot
(74) Attorney, Agent, or Firm—Lois Gianneschi

(57) ABSTRACT

The invention provides molds useful for the production of lenses with contoured edges. In particular, the molds permit production of a lens with an edge shaped to avoid its impingement on the lens wearer's conjuntival membrane.

16 Claims, 3 Drawing Sheets

FIG. 1a

FIG. 2
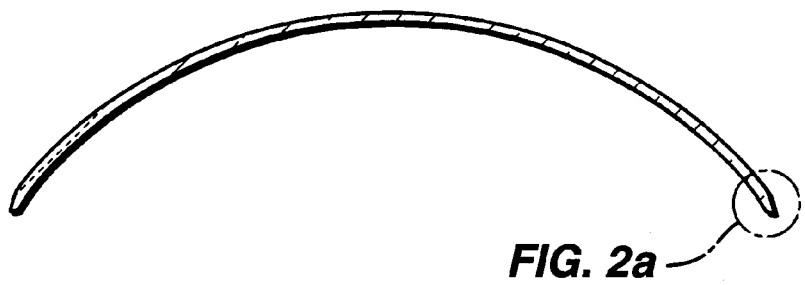
FIG. 2a
FIG. 2a
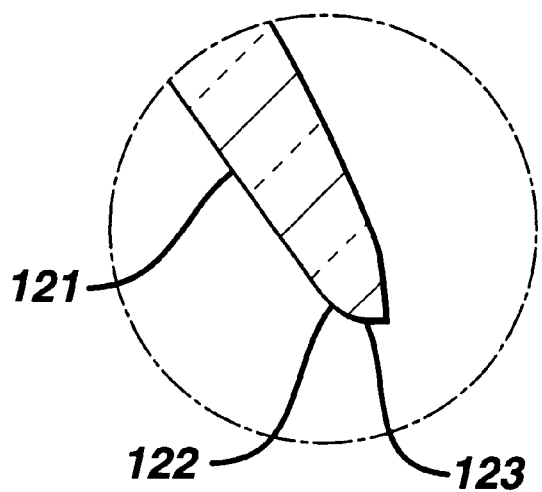
121
122
123

MOLDS FOR USE IN CONTACT LENS PRODUCTION

FIELD OF THE INVENTION

The invention relates to molds useful in the manufacture of contact lenses. In particular, the molds of the invention provide for the production of lenses with contoured edges.

BACKGROUND OF THE INVENTION

Methods and molds useful in the manufacture of contact lenses are well known. For example, in U.S. Pat. No. 5,540,410, incorporated herein in its entirety by reference, are disclosed molds and their use in contact lens manufacture. However, the known lens molds are disadvantageous in that they do not permit production of lens edges that are contoured. In particular, a mold for use in the production of a lens having an edge contoured so as to avoid impingement on the lens' wearer's conjunctival membrane is desirable.

BRIEF DESCRIPTION OF THE DRAWINGS

FIG. 2 is a cross-sectional view of a lens cast in the mold of the invention.

FIG. 2a is a close-up, cross-sectional view of a lens edge formed using the molds of the invention.

DETAILED DESCRIPTION OF THE INVENTION AND PREFERRED EMBODIMENTS

The molds of the invention permit formation of a contact lens having an edge the back surface of which permits movement of the lens and tear flow between the lens' back, or concave, surface and the lens wearer's cornea. Further, the shape of the lens edge formed using the molds of the invention avoids impingement of the lens edge on the lens wearer's conjunctival membrane.

In one embodiment, the invention provides a mold for the production of a contact lens comprising, consisting essentially of, and consisting of a front mold half and a back mold half wherein: the front mold half comprises, consists essentially of, and consists of a first article having a central curved section with a concave surface, a convex surface and a circular circumferential edge, the central section of the concave surface suitable for imparting a curvature to the front curve of a contact lens; the first article also having an axis of symmetry about the concave surface, and an inner mating surface continuous with and extending outwardly from the circular edge in a plane about 5 to about 15 degrees below the concave surface axis, an annular groove extending around the periphery of the inner mating surface, an outwardly tapering front wall extending upwardly from the annular groove, and an annular flange integral with and surrounding the outwardly tapering wall and extending radially outwardly from the concave and convex surfaces in a plane normal to the concave surface axis; the back mold half comprises, consist essentially of, and consists of a second article having a central curved section with a concave surface and a convex surface, the central section of the convex surface suitable for imparting a curvature to the back curve of a contact lens; and the second article also having an axis of symmetry about the convex surface, a shoulder extending outwardly from the convex surface, a fillet forming the junction between the outwardly extending shoulder and the convex surface, an outwardly tapering wall continuous with the shoulder and extending upwardly therefrom, and an annular flange integral with and surrounding the outwardly tapering wall and extending radially outwardly from the concave and convex surfaces in a plane normal to the convex surface axis.

Figure 1:
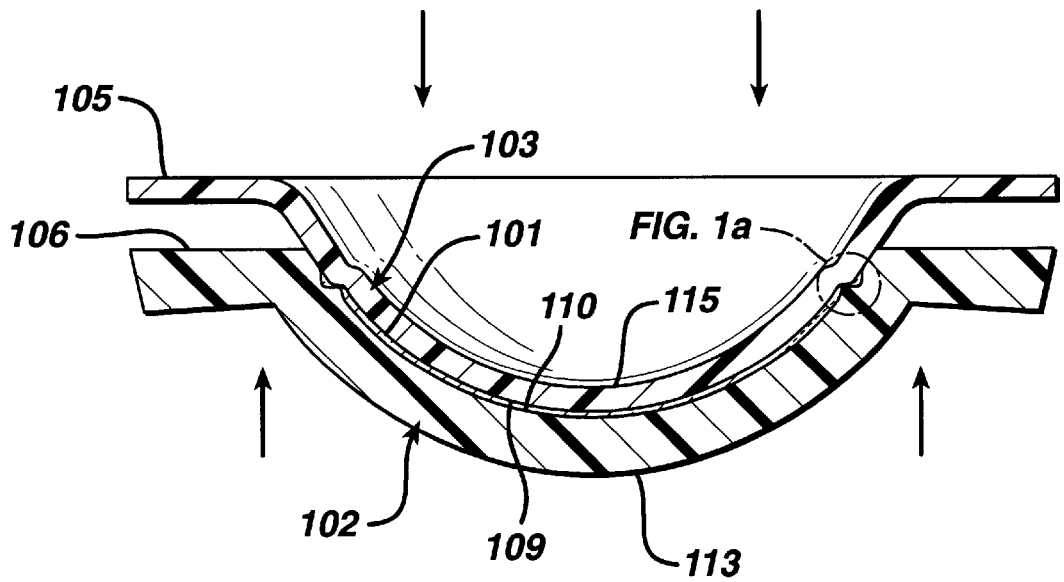
FIG. 1 is a cross-sectional side view of a mold of the invention.
Figure 1A:
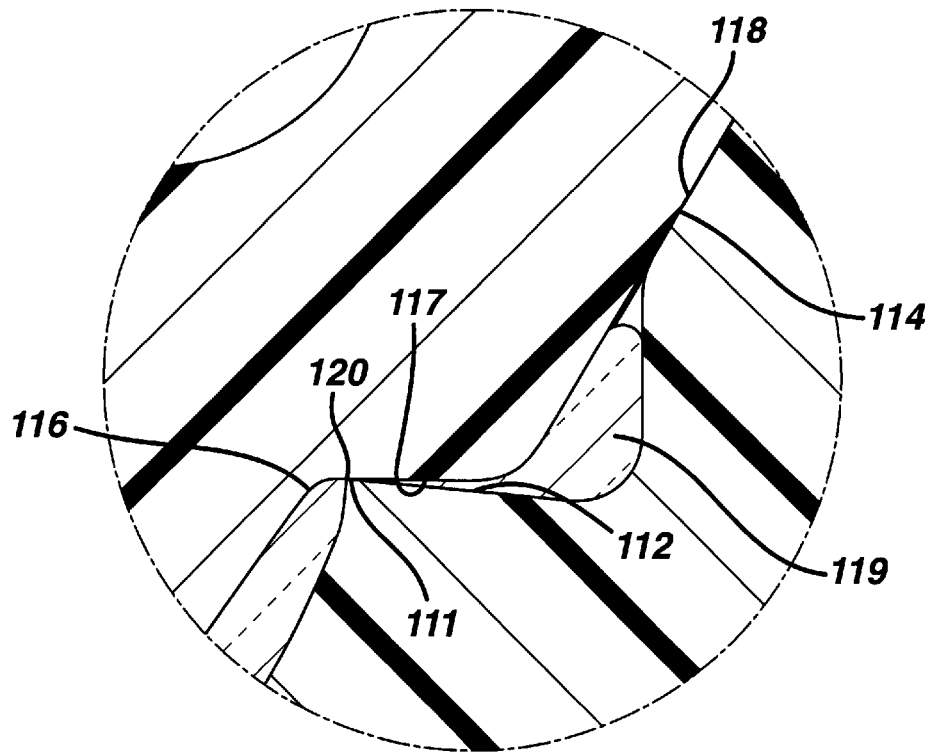
FIG. 1a is a close-up, cross-sectional side view of an area of the mold of the invention.

Referring to the drawings, in FIGS. 1 and 1a are illustrated a cross-sectional side view of a mold of the invention and a close up view of an area of the mold, respectively. The mold is composed of two, complementary mold halves; a front mold half 102 and a back mold half 103. The mold is useful in producing contact lenses by polymerization of a polymerizable composition. The contact lenses produced using the mold of the invention are unhydrated lenses that may be made ready to wear by hydrating, or swelling, the lenses by any method known in the art.

Front mold half 102 and back mold half 103 may be formed of any suitable thermoplastic polymer, preferably one that is sufficiently transparent to ultra-violet light to allow irradiation therethrough to promote polymerization of a contact lens material, preferably a soft contact lens material. Additionally, it is desirable that the material used is moldable to surfaces of optical quality at relatively low temperatures, exhibits excellent flow characteristics, and remains amorphous during molding. Preferred materials for forming the mold halves of the invention are polystyrene and polypropylene. Each mold half may be formed from the same or a different material than the other mold half. Production of the mold halves may be accomplished by any convenient method, but preferably as set forth in U.S. Pat. No. 5,540,410.

In the mold of the invention, more preferably the material used for formation of the back mold half 103 is harder, or less compressible, than that of front mold half 102. Given the configuration of the mold halves of the invention, the use of a softer front mold half material permits the back surface shoulder 117 to impinge, or flatten, the front surface circumferential edge 111. This permits the removal of excess lens material from mold cavity 101 at the parting line of the front and back mold halves. Alternatively, a back mold half that is softer than the front may be used resulting in front surface circumferential edge 111 impinging on back shoulder 117.

The front mold half 102 defines a central, curved section with an optical quality concave surface 110. Concave surface 110 has a circular, circumferential, well-defined edge 111 extending therearound. The edge 111, in conjunction with back surface circumferential edge 120, forms a well defined and uniform plastic radius parting line for the subsequently molded contact lens. Edge 111 typically has a curvature ranging from about 3 to 45 micrometers or less, preferably about 5 to about 30 micrometers, and the surfaces defining the edge can form an angle in the range of 75 to 90 deg. Continuous with and extending radially outwardly from edge 111 toward outwardly tapering front wall 114 is inner mating surface 112. Inner mating surface 112 is in a plane that is about 5 to about 15 degrees below a plane normal, or perpendicular, to the axis of symmetry of concave surface 110.

The junction between surface 109 and shoulder 117 is shaped to form fillet, or concave junction, 116. The radius of curvature of fillet 116 preferably is about 10 μm to about 250 μm, more preferably about 30 μm to about 100 μm. Convex surface 109, fillet 116, and back shoulder 117 define the back surface edge shape of the lens cast in cavity 101. For a lens formed in the mold of the invention, as depicted in FIG. 2, the lens edge as shown in detail in FIG. 2a has back surface 121 with edge fillet 122 and edge flat 123. The shape of the lens edge provides for a smooth contact between the lens wearer's conjunctiva and lens and avoids impingement of the conjunctival membrane. Additionally, this shape permits tears to be drawn under the lens by capillary action. Finally, the edge shape provides controlled on-eye movement in that the larger the radius of curvature of fillet 116, the more edge flat 123 will be lifted off of the lens wearer's conjunctiva Referring to FIG. 1a, annular groove 119 extends around the periphery of inner mating surface 112 and provides an overflow channel for excess lens material. Outwardly tapering wall 114 extends upwardly from annular groove 119. Extending radially outwardly from back surface circumferential edge 120 is shoulder 117 that is in a plane about 5 degrees above or below a plane normal to the axis of symmetry of convex surface 109. Shoulder 117 permits formation of edge flat 123 on the cast lens edge that lifts the front and back lens edge junction away from the wearer's conjunctiva. Shoulder 117 has a 360 degree contact with back surface circumferential edge 120 resulting in a pinch-point that acts to clip excess lens material from the cast lens, particularly in cases in which the back mold half material is softer than that of the front mold half. Applied pressure on the back or front mold half during lens curing ensures the 360 degree contact and minimizes tilt, or non-parallelism, between the front and back mold halves.

Outwardly tapering back surface wall 118 is continuous with and extends upwardly from shoulder 117. The tapering back surface wall 118 and front surface wall 114 permit convenient placement of the back mold half after lens material is deposited on the front mold half. Additionally, the tapering minimizes the side-to-side displacement of the front and back mold halves.

In front mold half 102, convex surface 113 is spaced generally parallel from concave surface 110 and an essentially uniplanar annular flange 106 extends radially outwardly from the surfaces 110 and 113 in a plane normal, or perpendicular, to the axis of symmetry of the concave surface 110. Similarly, back mold half 103 has spaced surfaces 109 and 115 and an essentially uniplanar annular flange 105 extending radially outwardly therefrom in a plane normal to the axis of convex surface 109. Concave surface 110 has the dimensions of the front curve of the unswelled lens to be cast in the mold and is sufficiently smooth so that the contact lens surface formed is of optically acceptable quality.

Back mold half 103 defines a central curved section with an optical quality convex surface 109 and a generally parallel concave surface 115. Convex surface 109 has the dimensions of the unswelled back surface curve of the lens to be cast and is sufficiently smooth so that the lens surface formed is of optically acceptable quality. Convex surface 113 of front mold half 102 and concave surface 115 of back mold half 103 need not have surfaces suitable to form optical quality surfaces.

Figure 3:
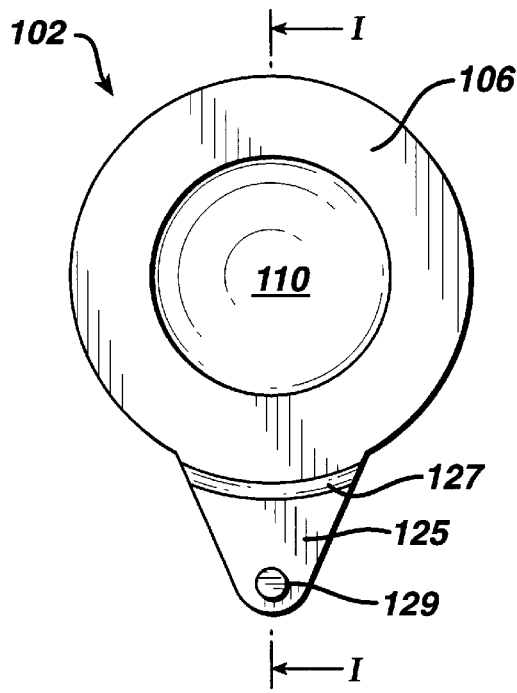
FIG. 3 is a top elevational view of the front mold half of the mold of the invention.
Figure 4:
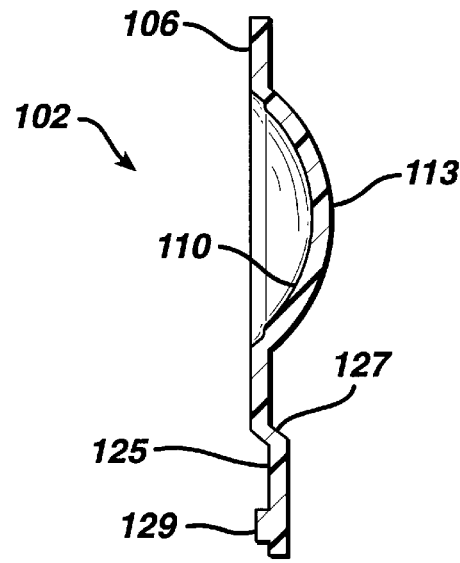
FIG. 4 is a cross-sectional side view of the mold half of FIG. 3 along I—I.
Figure 5:
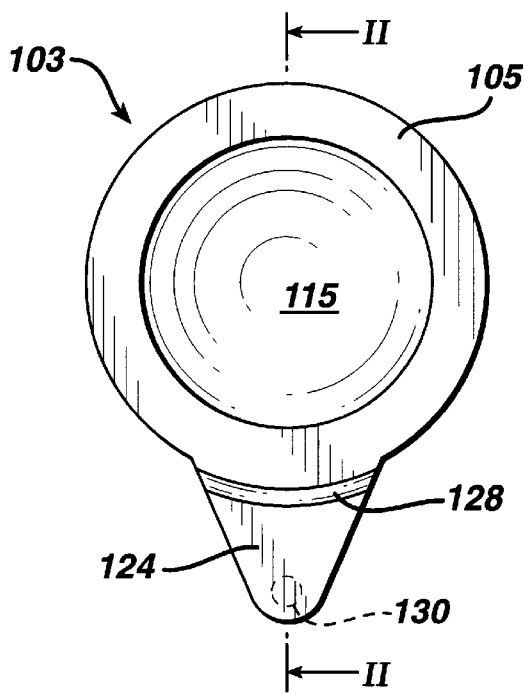
FIG. 5 is a top elevational view of the back mold half of the mold of the invention.
Figure 6:
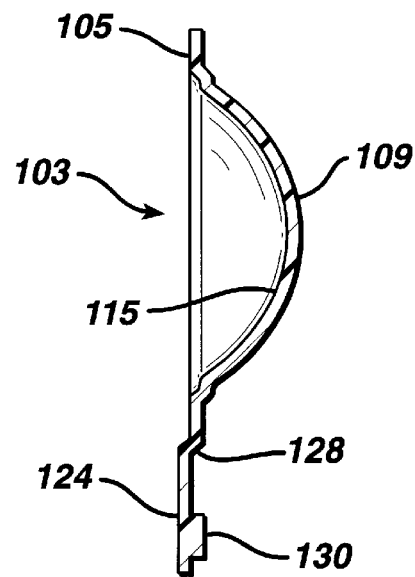
FIG. 6 is a cross-sectional side view of the mold half of FIG. 5 along II—II.

In FIGS. 3 and 5 are depicted top elevational and in FIGS. 4 and 6 cross sectional views of a preferred embodiment of front half 102 and back mold half 103, respectively. In this embodiment, front mold half 102 defines a generally triangular tab 125 integral with flange 106 and projecting from one side of the flange. Tab 125 is essentially uni-planar and lies in a plane normal to the axis of concave surface 110. Tab 125 defines angled, at about 45°, section 127. Tab 125 extends to the injection hot tip, or gate, that supplies the molten polymerizable composition to the mold. A small, circular projection 129 is positioned across from the injection hot tip.

In the top elevational view of back mold half 103 of FIG. 5, generally triangular shaped tab 124, defined by mold half 103, is shown integral with flange 105 and projecting from one side of the flange. Tab 124 extends to the injection hot tip and defines angled, at about 45°, section 128. Circular projection 130 is positioned across from the injection hot tip, as in front mold half 102. The position of tabs 124 and 125 extending from each side of the mold halves preferably are positioned one over the other to facilitate their use as handles to pry apart the mold halves after polymerization is completed.

In all embodiments, the front and the back mold halves are designed so as to permit rapid transmission of heat therethrough and yet be rigid enough to withstand the prying forces used to separate the mold halves during demolding. The mold of the invention may be used in any method for the manufacture of contact lenses. Preferably, however, the method of manufacture as set forth in U.S. Pat. No. 5,540,410 is used. Generally, in the preferred method, a quantity of polymerizable composition is placed onto the concave surface 110 of front mold half 102, preferably by injection. Back mold half 103 with convex surface 109 facing toward front mold half 102 concave surface 110 is placed onto the polymerizable composition. Preferably, the volume of the polymerizable composition used is greater than the volume of the cavity 101. Placement of the back mold half 103 onto front mold half 102, thus, will result in excess material flowing into annular groove 119. The area between flanges 105 and 106 provides an additional space for excess lens material. Convex surface 109 is preferably less wide than concave surface 110 to facilitate centering.

Once mold half 103 is placed onto front mold half 102, the mold halves preferably are pressed together using a force of about 2 to about 5 pounds. The force may be applied to flange 105 or 106 along the lines depicted by the arrows in FIG. 1. The force may be applied by any convenient means including, without limitation, using air pressure, mechanical means, such as a spring, or a combination thereof. In one embodiment, a deposition nozzle that is flat-shaped to lay across the flange or one that is a combination of cone and flat-shaped to fit partially into mold half 102 or 103 is used. The force is maintained throughout the polymerization of the polymerizable composition.

The polymerizable composition is preferably polymerized by exposure to ultra-violet radiation. Following completion of polymerization, the mold formed by front and back mold halves 102 and 103, respectively, is disassembled and the cast lens undergoes additional processing.

What is claimed is:

1. A mold for the production of a contact lens comprising a front mold half and a back mold half wherein:

the front mold half comprises a first article having a central curved section with a concave surface, a convex surface and a circular circumferential edge, the central section of the concave surface suitable for imparting a curvature to the front curve of a contact lens;

the first article also having an axis of symmetry about the concave surface, and an inner mating surface continuous with and extending outwardly from the circular edge in a plane about 5 to about 15 degrees below a plane normal to the concave surface axis of symmetry, an annular groove extending around the periphery of the inner mating surface, an outwardly tapering front wall extending upwardly from the annular groove, and an annular flange integral with and surrounding the outwardly tapering wall and extending radially outwardly from the concave and convex surfaces in a plane normal to the concave surface axis;

the back mold half comprises a second article having a central curved section with a concave surface and a convex surface, the central section of the convex surface suitable for imparting a curvature to the back curve of a contact lens; and the second article also having an axis of symmetry about the convex surface, a shoulder extending outwardly from the convex surface, a fillet forming the junction between the outwardly extending shoulder and the convex surface, an outwardly tapering wall continuous with the shoulder and extending upwardly therefrom, and an annular flange integral with and surrounding the outwardly tapering wall and extending radially outwardly from the concave and convex surfaces in a plane normal to the convex surface axis.

2. The mold of claim 1, wherein the front mold half and the back mold half each further comprises a generally triangular tab extending from the annular flange.

3. The mold of claim 1, wherein the front and back mold halves comprise a thermoplastic polymer transparent to ultra-violet light.

4. The mold of claim 3, wherein the thermoplastic polymer is polypropylene or polystyrene.

5. The mold of claim 1, wherein one mold half comprises polystyrene and the other mold half comprises polypropylene.

6. The mold of claim 1, wherein the front mold half is harder than the back mold half.

7. The mold of claim 1, wherein the back mold half is harder than the front mold half.

8. A method for producing a contact lens comprising the steps of
   a.) providing a mold according to claim 1;
   b.) injecting a polymerizable composition into the mold;
   c.) polymerizing the polymerizable composition; and
   d.) applying pressure, simultaneously with step c.), to the first article annular flange or the second article annular flange.

9. A mold for the production of a contact lens comprising a front mold half and a back mold half wherein:
   the front mold half comprises a first article having a central curved section with a concave surface, a convex surface and a circular circumferential edge, the central section of the concave surface suitable for imparting a curvature to the front curve of a contact lens;
   the first article also having an axis of symmetry about the concave surface, and an inner mating surface continuous with and extending outwardly from the circular edge in a plane about 5 to about 15 degrees below a plane normal to the concave surface axis of symmetry, an annular groove extending around the periphery of the inner mating surface, an outwardly tapering front wall extending upwardly from the annular groove, and an annular flange integral with and surrounding the outwardly tapering wall and extending radially outwardly from the concave and convex surfaces in a plane normal to the concave surface axis;

the back mold half comprises a second article having a central curved section with a concave surface and a convex surface, the central section of the convex surface suitable for imparting a curvature to the back curve of a contact lens; and the second article also having an axis of symmetry about the convex surface, a shoulder extending outwardly from the convex surface, a fillet having a radius of curvature of about 10 µm to about 250 µm forming the junction between the outwardly extending shoulder and the convex surface, an outwardly tapering wall continuous with the shoulder and extending upwardly therefrom, and an annular flange integral with and surrounding the outwardly tapering wall and extending radially outwardly from the concave and convex surfaces in a plane normal to the convex surface axis.

10. The mold of claim 9, wherein the front mold half and the back mold half each further comprises a generally triangular tab extending from the annular flange.

11. The mold of claim 9, wherein the front and back mold halves comprise a thermoplastic polymer transparent to ultra-violet light.

12. The mold of claim 11, wherein the thermoplastic polymer is polypropylene or polystyrene.

13. The mold of claim 9, wherein one mold half comprises polystyrene and the other mold half comprises polypropylene.

14. The mold of claim 9, wherein the front mold half is harder than the back mold half.

15. The mold of claim 9, wherein the back mold half is harder than the front mold half.

16. A method for producing a contact lens comprising the steps of:
   a.) providing a mold according to claim 9;
   b.) injecting a polymerizable composition into the mold;
   c.) polymerizing the polymerizable composition; and
   d.) applying pressure, simultaneously with step c.), to the first article annular flange or the second article annular flange.

* * * * *